US010590748B2

(12) United States Patent
Quintero et al.

(10) Patent No.: US 10,590,748 B2
(45) Date of Patent: Mar. 17, 2020

(54) RESERVOIR STIMULATION METHOD AND APPARATUS

(71) Applicant: Statoil Gulf Services LLC, Houston, TX (US)

(72) Inventors: Auristela Carolina Vasquez Quintero, Austin, TX (US); Jason Bryant, Spring, TX (US)

(73) Assignee: STATOIL GULF SERVICES LLC, Houston, TX (US)

( * ) Notice: Subject to any disclaimer, the term of this patent is extended or adjusted under 35 U.S.C. 154(b) by 139 days.

(21) Appl. No.: 15/712,919

(22) Filed: Sep. 22, 2017

(65) Prior Publication Data

US 2019/0093460 A1 Mar. 28, 2019

(51) Int. Cl.

| | |
|---|---|
| ***E21B 43/10*** | (2006.01) |
| ***E21B 23/06*** | (2006.01) |
| ***E21B 23/10*** | (2006.01) |
| ***E21B 43/267*** | (2006.01) |
| ***E21B 43/30*** | (2006.01) |
| ***E21B 43/263*** | (2006.01) |
| ***E21B 34/14*** | (2006.01) |
| ***E21B 43/26*** | (2006.01) |
| ***E21B 43/14*** | (2006.01) |
| ***C09K 8/68*** | (2006.01) |
| ***C09K 8/80*** | (2006.01) |

(52) U.S. Cl.

CPC ............ *E21B 43/105* (2013.01); *E21B 23/06* (2013.01); *E21B 23/10* (2013.01); *E21B 34/14* (2013.01); *E21B 43/14* (2013.01); *E21B 43/26* (2013.01); *E21B 43/263* (2013.01); *E21B 43/267* (2013.01); *E21B 43/305* (2013.01); *C09K 8/68* (2013.01); *C09K 8/80* (2013.01)

(58) Field of Classification Search

CPC ........ E21B 43/26; E21B 43/267; E21B 23/06; E21B 2034/007; E21B 34/14

See application file for complete search history.

(56) References Cited

U.S. PATENT DOCUMENTS 6,006,838 A * 12/1999 Whiteley ................ E21B 43/26 166/306
2003/0127227 A1 * 7/2003 Fehr ...................... E21B 33/124 166/306

(Continued)

OTHER PUBLICATIONS

International Search Report and Written Opinion of the International Searching Authority dated Nov. 20, 2018 for Application No. PCT/NO2018/050233.

*Primary Examiner* — Jennifer H Gay
(74) *Attorney, Agent, or Firm* — Birch, Stewart, Kolasch & Birch, LLP

(57) ABSTRACT

A reservoir stimulation tool for stimulating a formation surrounding a wellbore having an inner wall includes: a tubular string including an outer wall defining therein an inner bore, the tubular string being configured to be inserted into the wellbore so as to form an annular space between the tubular string and the inner wall of the wellbore, a plurality of ports formed in the outer wall of the tubular string; a plurality of port valves for opening or closing the ports; and a plurality of packers coupled to the tubular string, wherein each packer is configured to be expanded in order to engage the inner wall of the wellbore, thereby isolating two or more longitudinal segments of the annular space from each other.

21 Claims, 7 Drawing Sheets

(56) References Cited

U.S. PATENT DOCUMENTS

2007/0051521 A1* 3/2007 Fike ........................ E21B 23/06 166/387
2009/0194273 A1* 8/2009 Surjaatmadja .......... E21B 43/26 166/250.1
2009/0288833 A1* 11/2009 Graham .................. E21B 7/046 166/306
2011/0067870 A1* 3/2011 East, Jr. ................ E21B 33/124 166/298
2011/0100643 A1* 5/2011 Themig ................. E21B 34/102 166/373
2011/0186286 A1* 8/2011 Allen ...................... E21B 43/04 166/98
2011/0284214 A1 11/2011 Ayoub et al.
2013/0081817 A1* 4/2013 Norrid .................. E21B 34/102 166/305.1
2013/0264054 A1* 10/2013 East ........................ E21B 34/14 166/270.1
2014/0083689 A1* 3/2014 Streich .................. E21B 34/063 166/250.15
2014/0102708 A1* 4/2014 Purkis ..................... E21B 43/26 166/308.1
2014/0318781 A1 10/2014 Kofoed et al.
2014/0352968 A1 12/2014 Pitcher et al.
2015/0007988 A1* 1/2015 Ayasse .................... E21B 43/17 166/271
2015/0021021 A1* 1/2015 Merron ................... E21B 34/14 166/255.1
2015/0075780 A1* 3/2015 Richards ................. E21B 17/04 166/250.1
2015/0075807 A1* 3/2015 Allen ...................... E21B 43/14 166/373
2015/0159469 A1* 6/2015 Purkis ..................... E21B 23/04 166/373
2015/0285025 A1* 10/2015 Hughes ............... E21B 33/1216 166/308.1
2016/0177670 A1* 6/2016 Barton .................... E21B 34/10 166/308.1
2016/0258259 A1* 9/2016 Walton .................... E21B 34/14
2016/0298422 A1* 10/2016 Hyde, Jr. ................ E21B 43/14
2017/0058646 A1* 3/2017 Bernardi ................. E21B 43/01
2018/0023375 A1* 1/2018 Potapenko ............. E21B 43/17 166/308.1
2018/0196905 A1* 7/2018 Wu ......................... E21B 41/00
2018/0320479 A1* 11/2018 Wang ...................... E21B 33/12
2019/0093460 A1* 3/2019 Quintero ............... E21B 43/105
2019/0093465 A1* 3/2019 Bryant ..................... C09K 8/68

* cited by examiner

RESERVOIR STIMULATION METHOD AND APPARATUS

TECHNICAL FIELD

The invention relates to improvements in the stimulation of hydrocarbon reservoirs.

BACKGROUND

Stimulation, or hydraulic fracturing, of an onshore reservoir is used to increase production from the reservoir. The operation involves pumping a fracturing fluid at high pressure down a wellbore extending into the reservoir. The fluid puts pressure on the formation surrounding the wellbore, causing the formation to fracture.

The most common pad-fracturing operation deployed today uses plug-and-perf zipper methods, where two or more wells on a well pad are stimulated in a specific sequence to reduce downtime between frac stages and wireline trips. In this operation, one well is stimulated while simultaneously tripping into a nearby well on the pad with wireline to plug and isolate previously stimulated frac stages and perforate a new frac stage to be stimulated.

Perforated frac stages consist of multiple perforation clusters (usually 4-12 clusters per stage), wherein each perforation cluster is designed to be a primary hydraulic fracture from the wellbore into the reservoir. Due to a variety of factors, poor distribution of fluid and proppant across the clusters within a frac stage is highly probable. Near wellbore diverters are used to reduce the degree of poor fluid and proppant distribution. While diverters usually improve fluid and proppant distribution, this improvement is mostly marginal due to lack knowledge of how many perforations are taking fluid at any given time during the stimulation. In some cases, diverters can worsen distribution profiles.

Pinpoint methods are used to provide a more even distribution of fluid and proppant along the wellbore, as compared to multi-cluster plug-and-pert methods, because each fracture is generated sequentially in time. Most proven pinpoint methods require rigging coiled tubing or jointed tubing in-hole while stimulating the well. These methods are considered to constitute higher risk operations, compared to plug-and-perf operations. The use of rigging in-hole methods also limits pad stimulation efficiencies. Moreover, coiled tubing has limitations in terms of reaching extended wells.

There are pinpoint methods that do not require the use of tubing in-hole. In these methods, sleeves are permanently installed with the production liner or casing. Balls or collets are used to shift the sleeves open for stimulation one at a time and to isolate previously stimulated sleeves.

For the majority of multi-well pads (i.e., more than 98%), permanent wellbore construction tools are used, including perforation clusters and/or sleeve systems installed into the host casing. The most common completion method used today is the plug-and-perf (stimulation per set of perforation clusters), which is considered very efficient for stimulating a pad of wells when the zipper technique is possible. However, a poor stimulation distribution within the reservoir is obtained and it requires workover to remove the plugs that were installed to isolate the stages. In contrast, pinpoint systems constitute a more controlled completion method for efficient stimulation operations for a single well, with an even stimulation distribution within the reservoir. But the constraint is that the capital expenditure is greater compared to plug-and-perf methods for a pad of wells.

In addition, most of these pinpoint systems available in the market consists of permanently installed sleeves which are not suitable or may not be reliable for future secondary recovery methods or for future re-stimulation. Permanent sleeves are expensive and only function during the stimulation portion of the well's life (e.g. days to stimulate versus 40 years of productive life). Additionally, the sleeves are exposed to the reservoir and well environment, compromising their functionality for future stimulation applications.

SUMMARY OF THE INVENTION

The invention provides a reservoir stimulation tool, a method of stimulating a formation surrounding a wellbore, a method of stimulating a plurality of wells, and a method of producing hydrocarbons, as set out in the accompanying claims.

Preferred embodiments of the invention will now be described, by way of example only, with reference to the accompanying drawings.

DESCRIPTION OF PREFERRED EMBODIMENTS

The embodiments provide a new temporary fracturing completion system that may reduce the operational risks that are associated with traditional completion methods, reduce well costs, and increase production recovery of low productivity wells. The embodiments may enable control of the design of the fractures and of the distribution of the fluid along the wellbore.

Figure 1:
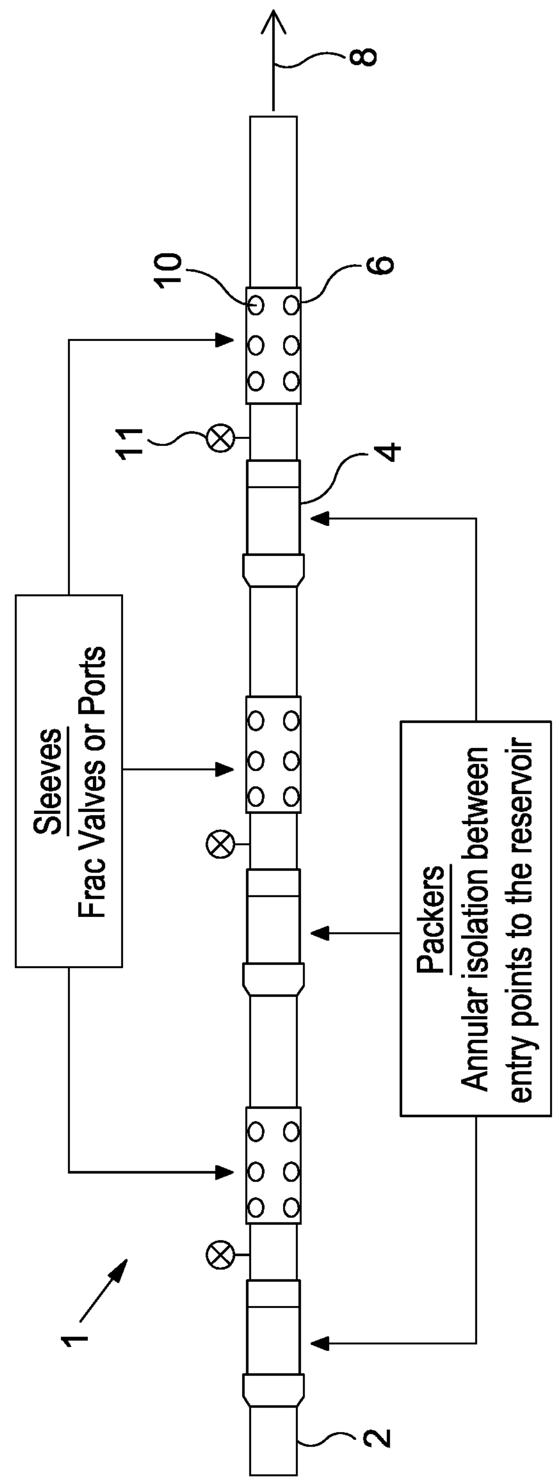
FIG. 1 is a schematic diagram of a section of an embodiment of the reservoir stimulation tool according to an embodiment of the invention.

FIG. 1 shows an embodiment of the reservoir stimulation tool 1 (also referred to as "Direct Access Reservoir Tool" and "the tool"). The tool 1 consists of multiple tubular sections, which form a tubular string 2. Only a part of the string 2 is shown in FIG. 1. The tool 1 has a plurality of packers 4 and sleeves 6 coupled to the string 2. The packers 4 are spaced apart along the longitudinal axis 8 of the string 2 with one sleeve 6 between any two adjacent packers 4. The packers 4 are expandable to engage the inner wall of the wellbore casing (not shown). Each sleeve 6 can be individually actuated to open a port 10 in the tubular string 2. The ports 10 allow fracturing fluid to flow from the tubular string out into the annulus between the string 2 and the wellbore.

Each port 10 may comprise multiple fluid channels/holes. The tool also comprises a sensor unit 11 associated with each section of the string 2. Each sensor unit 11 may comprise one or more sensors (not shown) that are configured to measure one or more properties of a wellbore fluid.

The overall length of the tool can be chosen to correspond to the length of wellbore that is to be stimulated. This allows stimulation of the entire well without having to move or withdraw the tool. This in turn allows the fracturing operation to be carried out without a rig or coiled tubing during the stimulation process, as there is no need to move the tool from one frac stage to the next.

The packers can be set at the same time mechanically, hydraulically or electrically and retrieved either mechanically by upward pulling or electrically. The packers may be configured to release when experiencing a pulling force via the tubular string. For example, the packers may comprise shearing pins, which break when experiencing a sufficiently large shearing force. This allows the tool to be easily extracted (run out) after completion.

Each port in the reservoir stimulation tool is controlled by a port valve, wherein the above described sleeve is one example of such a port valve. A port valve, in this context, includes any mechanism for opening and closing a port.

The tool may be equipped with devices (such as the sensor units 11) to monitor the well during stimulation and/or production. For example, the tool could include sensors for measuring temperature, pressure, flow rates, gas to oil ratio (GOR), water to oil ratio (WOR) etc. Some data may be stored at the tool during stimulation and/or production, in order to be recovered for analysis at the surface after the tool has been run out of the well. In other cases the data can be relayed to surface in real time. Having one monitoring device (or sensor unit) in each section of the tool (i.e. associated with each port) enables zonal analysis during stimulation and/or production.

After a stage has been fractured it has to be isolated from the next stage to be completed. In one embodiment, the completed frac stage is isolated by shifting the sleeve back to its closed position. That is, the sleeve is configured to be actuated again to close the associated port, and hence prevent fluid communication between the completed stage and the inner bore of the tool. An advantage of such a system is the ability to frac any number of stages in any desired order, with individual frac isolation. Alternatively, the tool may comprise isolation valves (e.g. a baffle with a ball seat) in the inner bore associated with each sleeve. Each isolation valve is arranged downstream of the associated port, so that when the isolation valve is closed the string below the port is isolated. In this embodiment each frac stage has to be completed in order, starting with the lowermost stage (at the toe).

In one embodiment, the tool has well-matched dimensions and pressure ratings for a 15 kpsi reservoir. The tool may be designed to run inside 5½" and/or 4½" production casing. The sleeves and valves may be operated mechanically (e.g. hydraulically) or electrically, and may be designed so that they cannot be opened or closed accidentally. The tool can be configured to be compatible with CO2-hybrid fracturing design.

Figure 2:
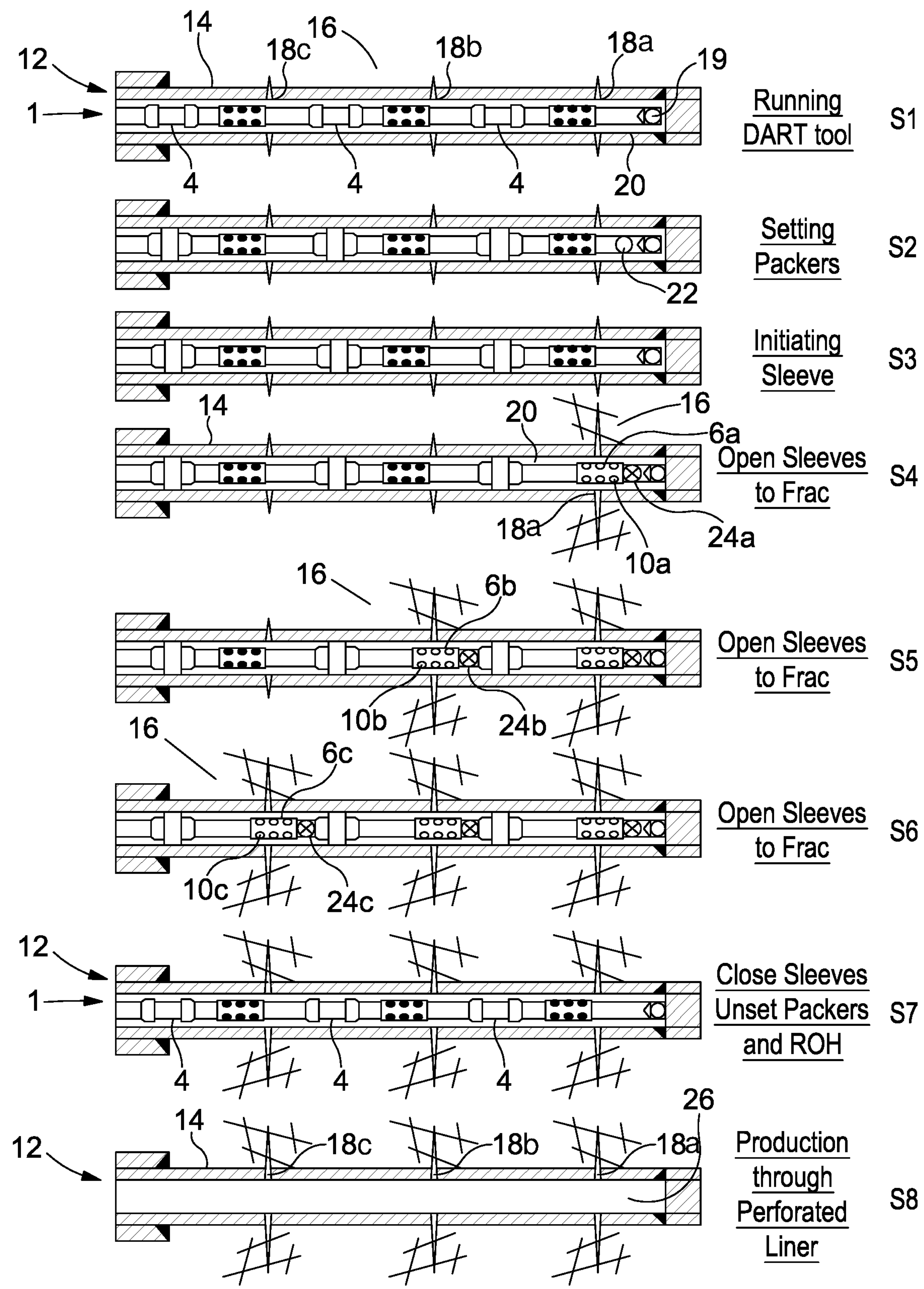
FIG. 2 is a schematic diagram of some of the steps of an embodiment of the method of stimulating/fracturing a well with a reservoir stimulation tool.

FIG. 2 illustrates the steps of a fracturing operation using an embodiment of the reservoir stimulation tool 1. In step S1 the tool 1 has been inserted into the wellbore 12. The liner 14 of the wellbore 12 has previously been perforated to allow fracturing fluid to enter the formation 16. The tool 1 is positioned axially such that there is one perforation 18*a,b,c* (or perforation cluster 18*a,b,c*) located between any two packers 4. A type of valve 19 is installed at the bottom of the tool 1 which allows fluid to flow from the tool 1 to the annulus 20 for circulation, but the opposite flow direction is restricted (no fluid can flow from the wellbore into the tool). In step S2, a dissolvable ball plug 22 is pumped into the well 12 to allow the inner pressure to build up in order to set the packers 4. The packers 4 are hydraulically expanded/set to lock the tool 1 in place. The expanded packers 4 prevent fluid flow in the annulus 20, between the string 2 and the wellbore 12, between frac stages. In step S3, the ball plug 22 has dissolved to establish fluid flow from the inner string 2 to the annulus. This enables mechanical devices (i.e collets and balls) to be pumped down to activate sleeves 6 in the string 2 and set isolation valves 24. In step S4, the first sleeve 6*a*, closest to the toe of the well, is actuated to open the first port 10*a*. A dissolvable ball (not shown) is set in place to close an isolation valve 24*a* and direct fluid to flow through the port 10*a*. Fracturing fluid is pumped down the tubular string 2 and enters the annulus 20 between the string 2 and the wellbore 12 through the port 10*a*. The fracturing fluid then enters the formation via the perforation(s) 18*a* in the liner 14 in the first frac stage, causing the formation 16 to fracture. In step S5, the next sleeve 6*b* is actuated to open the second port 10*b*. A dissolvable ball is set in place to isolate the first frac stage from the second frac stage by closing an isolation valve 24*b*. Fracturing fluid is again pumped down through the tool 1 and out of the second port 10*b* to fracture the formation 16 at the second frac stage. In step S6, the third sleeve 6*c* is actuated to open the third port 10*c*. A valve 24*c* is closed to isolate the third stage from the previous two completed stages, and the third stage is then fractured. In step, S7 all the ports 10 are closed by shifting the sleeves 6 back to their original positions and all isolation ball type valves 24 are removed/dissolved. The packers 4 are released by applying a pulling force to the tool 1. In step S8, the tool has been run out of the wellbore and production fluid 26 flows through the perforations 18*a,b,c* in the liner 14 and into the wellbore 12.

Figure 3:
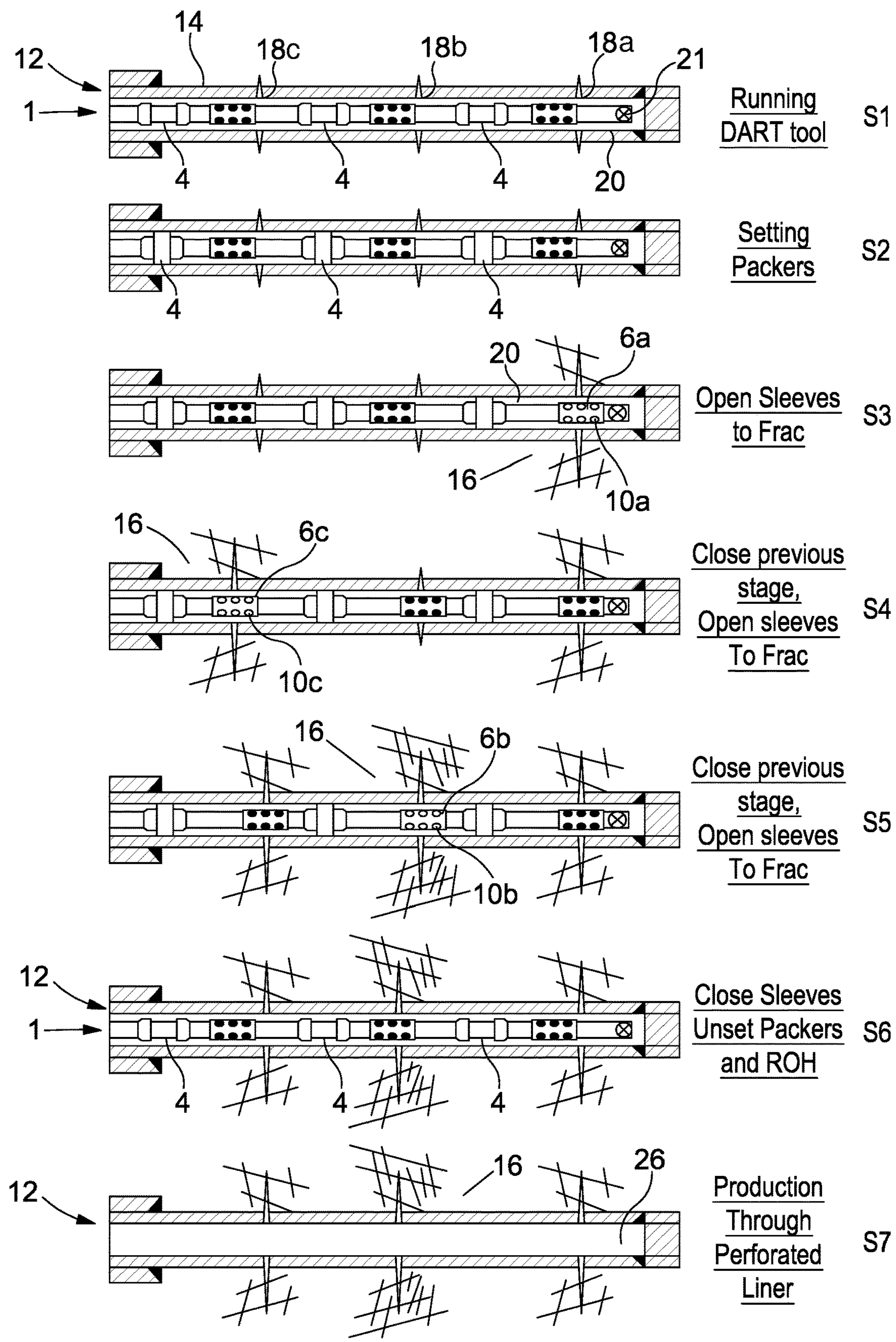
FIG. 3 is a schematic diagram of some of the steps of another embodiment of the method of stimulating/fracturing a well with a reservoir stimulation tool.

FIG. 3 illustrates the steps of a fracturing operation using an embodiment of the reservoir stimulation tool, in which the sleeves and packers are activated electrically, and can be activated out of sequence. That is, stimulation does not need to occur in sequence from toe to heel as in FIG. 2. Fracturing out of sequence may enable better stimulation due to stress shadow effects from previously stimulated regions. In step S1 the tool 1 is inserted into the wellbore 12. The liner 14 of the wellbore 12 has previously been perforated to allow fracturing fluid to enter the formation 16. The tool 1 is positioned axially such that there is one perforation (or perforation cluster) 18*a,b,c* located between any two packers 4. The tool is isolated from the annulus 20 with a valve 21 at the bottom, so fluids cannot flow from the wellbore into the tool. In step S2, the packers 4 are expanded/set to lock the tool 1 in place. The expanded packers 4 prevent fluid flow in the annulus 20, between the string 2 and the wellbore 12, between frac stages. In step S3, a first sleeve 6*a*, closest to the toe of the well, is actuated to open the first port 10*a*. Fracturing fluid is pumped down the tubular string 2 and enters the annulus 20 between the string 2 and the wellbore 12 through the port 10*a*. The fracturing fluid then enters the formation via the perforation(s) 18*a* in the liner 14 in the first frac stage, causing the formation 16 to fracture. In step S4, the third sleeve 6*c* is actuated to open the third port 10*c*, while the previous sleeve 6*a* with port 10*a* are closed to isolate the first frac stage. Fracturing fluid is again pumped down through the tool 1 and out of the third port 10*c* to fracture the formation 16 at the third frac stage. In step S5, the second sleeve 6*b* is actuated to open the second port 10*b*, and the port 10*c* from the previous stimulated sleeve 6*c* is closed to isolate the second stage from the previous two completed stages, and the second stage is then fractured. In step, S6 all the ports 10 are closed, by shifting all sleeves 6 back to their original positions. All packers 4 are released electrically. In step S7, the tool has been run out of the wellbore and production fluid 26 flows through the perforations 18*a,b,c* in the liner 14 and into the wellbore 12.

In another embodiment, the reservoir stimulation tool may be used to stimulate the well without hydraulic fracturing. For example, the tool may be used for matrix stimulation. Instead of pumping fracturing fluid down the tool at high pressure, a different stimulation fluid can be injected at a pressure below that of the fracturing pressure of the formation. Steam or acid or carbon dioxide or nitrogen or natural gas or natural gas liquids may be injected in this way in order to stimulate the formation.

Primary Recovery

In general, the installation procedure consists of: Running the tool into the well for the fracturing operation after the well has been cased and perforated; set the packers all at the same time; and with the single point entry stimulate the well by stages. Hence there is provided, a pinpoint stimulation method to fracture, stimulate, and clean out the well with a single trip. There is no need of leaving expensive sleeves in the well (permanent completion) or using expensive rigs or coiled tubing during the stimulation operation.

For production, the tool can be removed, to be used to stimulate other wells. After running the tool out of the well, the valves and packers are reconditioned before running the tool in a second well. For example, if the packers comprise shearing pins to facilitate their release after completion, these would have to be replaced. The length of the tool may also be adjusted before re-using it.

Alternatively, the tool can stay in the well for zone production control and/or analysis. That is, after completion the tool may be left in the well with the packers expanded. The sleeves are then used to open and close ports in order to achieve zonal control or zonal analysis.

Secondary Recovery (Re-Stimulation of Existing Wells)

Existing wells, which have previously been fractured, can be stimulated again to increase production. The reservoir stimulation tool can be used both for stimulating low productivity wells and for re-fracturing old wells with declined production. The tool may be used for re-fracturing, huff and puff and/or flooding. The tool allows for control of injection and/or production in segments of the well during secondary recovery applications.

In one embodiment, the tool may also be used to re-stimulate under-performing zones.

The fracturing fluid is pumped from the top of the wellbore downstream towards the reservoir. Therefore, in this specification the term "downstream" is used to refer to the direction from the top of the wellbore (i.e. the surface) down towards the reservoir.

In one embodiment, multiple wells on a pad could be installed with sleeves that open one at a time such that one fracture in each well is stimulated one at a time, while more than one well on the well pad are stimulated simultaneously. Single-point frac sleeves can be used to simultaneously stimulate multiple wells, where in each well one primary fracture is being generated one at a time. In this scenario, fluid and proppant distribution along the lateral and within the reservoir should be significantly improved.

Having described various embodiments of a reservoir stimulation tool, we will now describe systems and methods in which the tool may be used for multi-well stimulation.

We describe embodiments which provide a system and methods for stimulating two or more wells simultaneously on a well pad level, for the purposes of increasing surface rates of fracturing fluid and proppant, decreasing surface treating pressure, and enhancing stimulation effectiveness in local regions of the reservoir.

By distributing the surface rates to multiple wells, wellbore friction (a large contributor to surface treating pressure) is reduced. This can be realized even at relatively high surface treating rates. By simultaneously generating multiple hydraulic sources from wells in the reservoir, fracture complexity within the reservoir may be enhanced. Fractures emanating from adjacent wells may interact to create more complex fracture networks in the formation. Single-point entry methods with sleeves will likely result in better fluid and proppant distribution along the horizontal section of the well and within the reservoir, ultimately leading to improved recovery.

In one embodiment, wells on a pad could be installed with sleeves that open one at a time such that one fracture in a well is stimulated individually (single-point entry or pin-point). In addition to this, more than one well on a pad is stimulated simultaneously. Each sleeve is associated with one perforation cluster, which when stimulated creates one (single) primary fracture.

Other openings allowing fluid communication between the wellbore and the surrounding formation can also be used to stimulate a region of the wellbore. For example, a permanently installed casing may have sleeves with slots that can be selectively opened to allow stimulation fluid to flow through the slots and into the formation.

Figure 4:
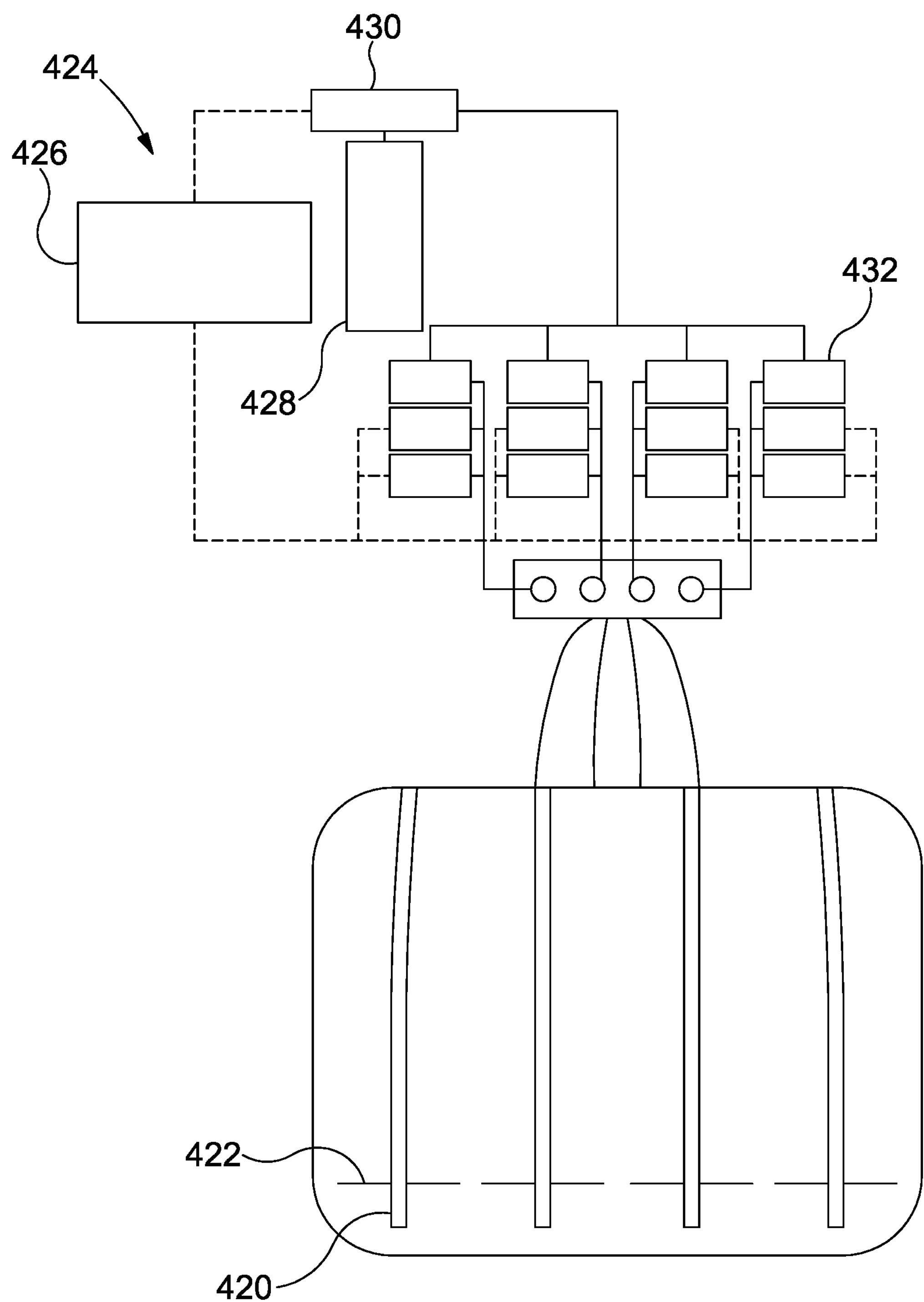
FIG. 4 is a schematic diagram of a setup for stimulating a plurality of wells according to an embodiment of the invention.

FIG. 4 shows a schematic diagram of an embodiment, where single-point frac sleeves (not shown) can be used to simultaneously stimulate four wells 420 with one frac crew, where, in each well 420, one primary fracture 422 is being generated one at a time in each well. The surface equipment 424 includes water tanks 426, proppant tanks 428, blender 430, and high pressure pumps 432. Water and proppant (e.g. sand) are mixed in the blender 430 and the resulting slurry is fed to the pumps 432. There are four groups of high pressure pumps 432, each group feeding into one well 420. The slurry injected into the wells 420 is combined from two sources (split-flow fracturing): one concentrated slurry source from the blender 430 and one "clean" source (i.e., without proppant) directly from the water tanks 426 using a boost pump (not shown). The high pressure pumps 432 are divided into two sets: one set pumping the concentrated slurry and one set pumping the clean fluid. Proppant is known to damage pumps, and split-flow fracturing may reduce the amount of maintenance required.

In another embodiment, two or more clusters or sleeves may be stimulated in each well during simultaneous stimulation of the wells. Because of the reduced wellbore friction, sufficiently high flow rates per cluster/sleeve can be achieved for more than one cluster/sleeve per stage.

Macromolecules, such as polymers or other chemicals, may be dissolved in the water in or before the blender. These macromolecules can improve proppant transport and lower the required surface treating pressures. The dissolved macromolecules can be used to cause gelling (increase viscosity) and/or to lower the friction in the system.

In this scenario, fluid and proppant distribution along a lateral and within the reservoir may be significantly improved. Additionally, since wellbore friction is significantly reduced, higher surface flow rates at lower surface treating pressures can be maintained. This arrangement will use much less fuel for the stimulation process and reduce the cost of equipment failure and maintenance significantly. For comparison, to stimulate a frac stage with four perforation clusters in a single well, using the conventional plug-and-perf zipper method, a surface flow rate of 70 bpm (barrels per minute) or 17.5 barrels per minute per cluster may be achieved with a surface treating pressure of 8000 psi. In the above described embodiment, on the other hand, a surface flow rate of 120 bpm (e.g. 30 bpm of fluid into each well) or 30 barrels per minute per sleeve can be achieved at only 5300 psi, because of the lower wellbore friction.

Figure 5:
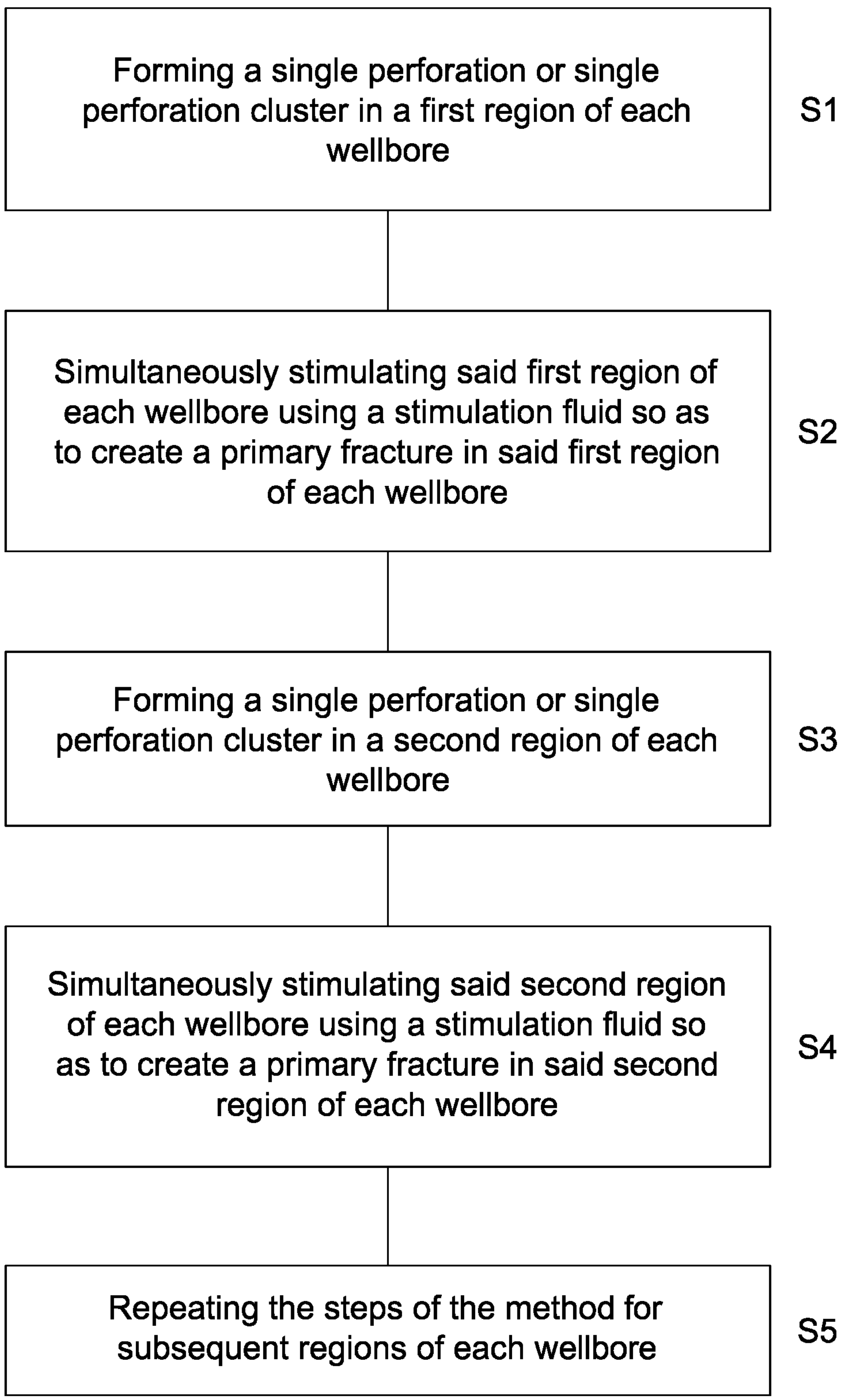
FIG. 5 is a flow chart of the steps of a method for stimulating a formation.

FIG. 5 shows the steps of a method for stimulating the formation containing the wellbores according to an embodiment. In the first step a single perforation or single perforation cluster is formed in a first region of each wellbore S1. That is, the first frac stage is prepared for fracturing/stimulation, by perforating the casing or liner of the wellbore. It is in order to create a single primary fracture in each frac stage of any one wellbore that only one perforation (or one perforation cluster) is made in the first region. In the second step, the first region (frac stage) of each wellbore is simultaneously stimulated using a stimulation fluid so as to create a first primary fracture in the first region of each wellbore S2. The process is then repeated for the next frac stage in each well. This involves forming a single perforation or perforation cluster in a second region of each wellbore S3; simultaneously stimulating the second region of each wellbore using a stimulation fluid so as to create a primary fracture in the second region of each wellbore S4; and repeating the steps of the method for subsequent regions of each wellbore S5.

In certain embodiments for stimulating two or more wells simultaneously, the surface treating pressure may range from about 1,000 psi (pounds-force per square inch) to 12,000 psi. In certain embodiments, the surface treating pressure may range from about 1,000 psi to 8,000 psi. In certain embodiments, the surface treating pressure may range from about 1,000 psi to 6,000 psi.

In certain embodiments for stimulating two or more wells simultaneously, the flow rate per cluster (or sleeve) may range from about 5 bpm (barrels per minute) per cluster (or sleeve) to 150 bpm per cluster (or sleeve). In certain embodiments, the flow rate per cluster (or sleeve) may range from about 15 to 150 bpm per cluster (or sleeve). In certain embodiments, the flow rate per cluster (or sleeve) may range from about 25 bpm per cluster (or sleeve) to 150 bpm per cluster (or sleeve).

Another way of defining the flow rate is in terms of the flow rate per stimulated lateral length of the wellbore. The stimulated lateral length of a wellbore is defined as the distance between:

a) the most downstream fluid connection between that wellbore and the formation at which stimulation is taking place, and b) the most upstream fluid connection between that wellbore and the formation at which stimulation is taking place.

For example, in a frac stage with multiple perforation clusters, the stimulated lateral length is the distance from the top of the most upstream cluster to the bottom of the most downstream cluster. If there is only one cluster in the stage, then the stimulated lateral length is the lateral distance from top to bottom of that cluster. If there is a single opening, i.e. a single fluid channel, then the stimulated lateral length is the lateral distance between the edges of that opening. In one embodiment, the flow rate in any one well of the multiple wells being simultaneously stimulated is greater than 1 bpm per foot of stimulated lateral length.

Figure 6:
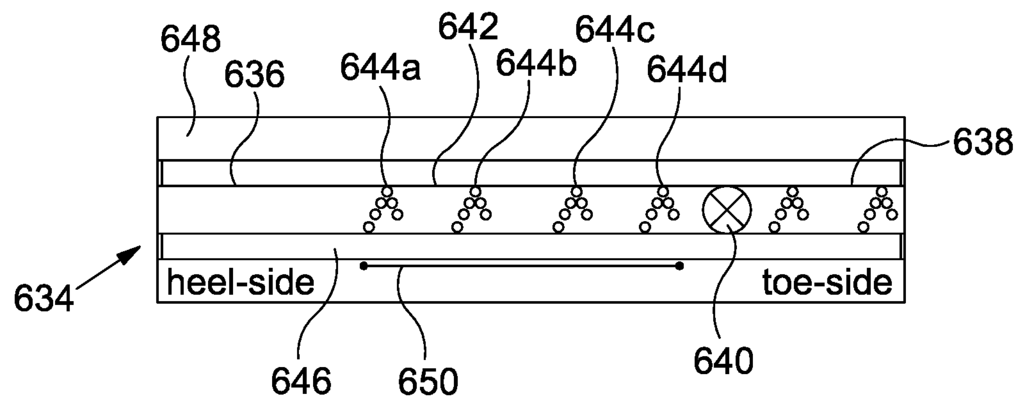
FIG. 6 is a schematic diagram of a section of a wellbore with a perforated wellbore casing.

FIG. 6 shows a section of a wellbore 634 with a perforated casing 636. A first region 638 (frac stage) has already been stimulated and is isolated by a plug 640. A second region 642 towards the heel (upstream) has been perforated with four perforation clusters 644*a,b,c,d*. The casing 636 is surrounded by cement 646, and the perforations 644*a,b,c,d* may extend through the cement 646. The stimulated lateral length 650 of this second region 642 is marked between the cluster 644*a* closest to the heel and the cluster closest to the toe 644*d*. As an example, if the flow rate into the wellbore is 70 bpm, and the stimulated lateral length 650 is 70 feet, then the flow rate is 17.5 bpm per cluster or 1 bpm per foot of stimulated lateral length.

Figure 7:
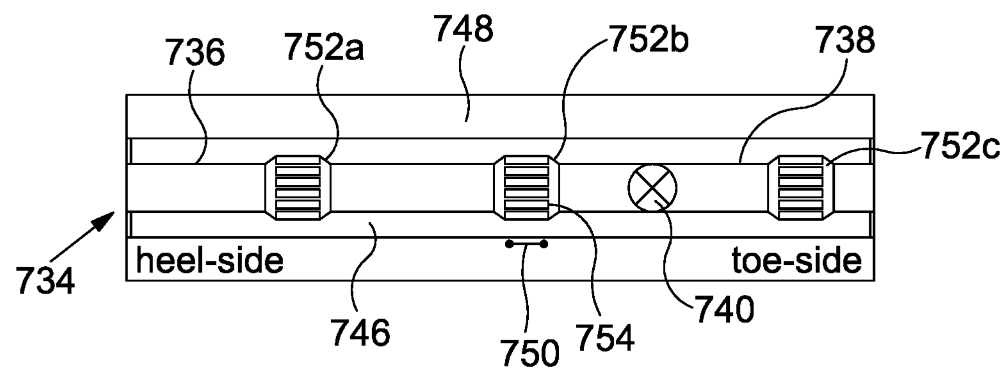
FIG. 7 is a schematic diagram of a section of a wellbore with a wellbore casing with sleeves.

FIG. 7 shows a section of a wellbore 734 with a casing 736 with permanently installed sleeves 752*a,b,c* with slots 754 to allow fluid communication between the wellbore 734 and the formation 748 when the sleeves 752*a,b,c* are open. A permanent sleeve 752*c* in the first region 738 has already been stimulated and is left open. A plug 740 isolates this stage/sleeve from the next sleeve 752*b*, which is currently being stimulated. A third permanent sleeve 752*a* upstream of the currently stimulated sleeve 752*b* is closed. The only fluid communication between the wellbore 734 and the formation 748 is through the slots 754 of the currently stimulated sleeve 752*b*, and the stimulated lateral length 750 is therefore equal to the lateral length of the slots 754.

In certain embodiments for stimulating two or more wells simultaneously, the flow rate per cluster (or sleeve) per 1,000 psi STP (surface treating pressure) may range from about 1 bpm (barrels per minute) per cluster (or sleeve) per 1,000 psi STP to 40 bpm per cluster (or sleeve) per 1,000 psi STP. In certain embodiments, the flow rate per cluster (or sleeve) per 1,000 psi STP (surface treating pressure) may range from about 3 bpm (barrels per minute) per cluster (or sleeve) per 1,000 psi STP to 40 bpm per cluster (or sleeve) per 1,000 psi STP. In certain embodiments, the flow rate per cluster (or sleeve) per 1,000 psi STP (surface treating pressure) may range from about 5 bpm (barrels per minute) per cluster (or sleeve) per 1,000 psi STP to 40 bpm per cluster (or sleeve) per 1,000 psi STP. In certain embodiments, the flow rate per cluster (or sleeve) per 1,000 psi STP (surface treating pressure) may range from about 8 bpm (barrels per minute) per cluster (or sleeve) per 1,000 psi STP to 40 bpm per cluster (or sleeve) per 1,000 psi STP.

In many cases it may be desirable to deliver the most hydraulic horsepower possible to the perforation clusters. The horsepower is proportional to the product of bottom-hole flowing pressure (BHFP) and to flow rate through perforation clusters or sleeves. Bottom-hole flowing pressure is mostly determined by formation properties (e.g., depth and pore pressure) and usually ranges from 5,000 psi to 15,000 psi for virgin reservoirs, and from 2,000 psi to 8,000 psi for appreciably depleted reservoirs. For a wellbore in a given reservoir, BHFP usually does not vary by more than 10% (e.g., from 100 psi to 1500 psi). For this reason, perforation flow rate can be adjusted to maximize hydraulic horsepower to perforation clusters or sleeves. To maximize hydraulic horsepower to perforation clusters or sleeves, surface flow rate should be maximized. In multi-cluster fracturing applications, the surface flow rate will be distributed over multiple clusters thereby distributing horsepower over multiple clusters. In an example of a single well with four perforation clusters, a surface rate of 70 bpm is distributed over the four clusters for an average of 17.5 bpm/cluster. For multi-cluster applications including zipper PnP and in prior simultaneous fracturing applications, the cluster average flow usually spans from 4 to 20 bpm/cluster. In the above described embodiment, where multi-well stimulation is applied, the surface flow rate is 120 bpm and the average flow rate is 30 bpm/sleeve. Additionally, the surface treating pressure is 5300 psi, nearly 3000 psi below that in the PnP example. While the surface treating pressure is lower in the above described embodiment (than the example for multi-cluster applications), the average horsepower delivered to the formation at the sleeve or cluster is higher. Surface treating pressures depend on BHFP, wellbore properties (e.g., length and diameter of casing/liner strings) and slurry properties (e.g., density and friction properties), and usually ranges from 6000 to 12,000 psi for virgin reservoirs, and ranges from 3,000 to 8,000 in appreciably depleted reservoirs. Maximum attainable surface treating pressures depend on wellbore properties (e.g., burst pressure rating of exposed casing/liner strings, length and diameter of casing/liner strings), and maximum attainable surface treating pressures is considered during the wellbore design process.

A perforation cluster is a dense group of holes through casing/liner (and cement in some cases) spanning a section of the wellbore within a reservoir of interest, where fluid connection is established between the formation/reservoir and the wellbore. In simple terms, one dominate hydraulic fracture (or primary fracture) is created from a perforation cluster. Typical perforation clusters used in industry consist of 6 holes spanning 1 foot of wellbore or 12 holes spanning 2 feet of wellbore. The hole diameter is usually between 0.25 to 0.5 inches. Often, holes are evenly distributed axially and radially along the section of wellbore. In some cases, perforation clusters may consist of less than 6 holes, and in rare cases a perforation cluster could be one hole. In most cases, perforation clusters span 2 feet or less of wellbore, but in rare cases perforation clusters may span more than 2 feet but not more than 10 feet. Distances between perforation clusters are usually 25 to 65 ft, but in rare cases the distance can be as high as 100 feet or more or as low as 10 feet.

Figure 8:
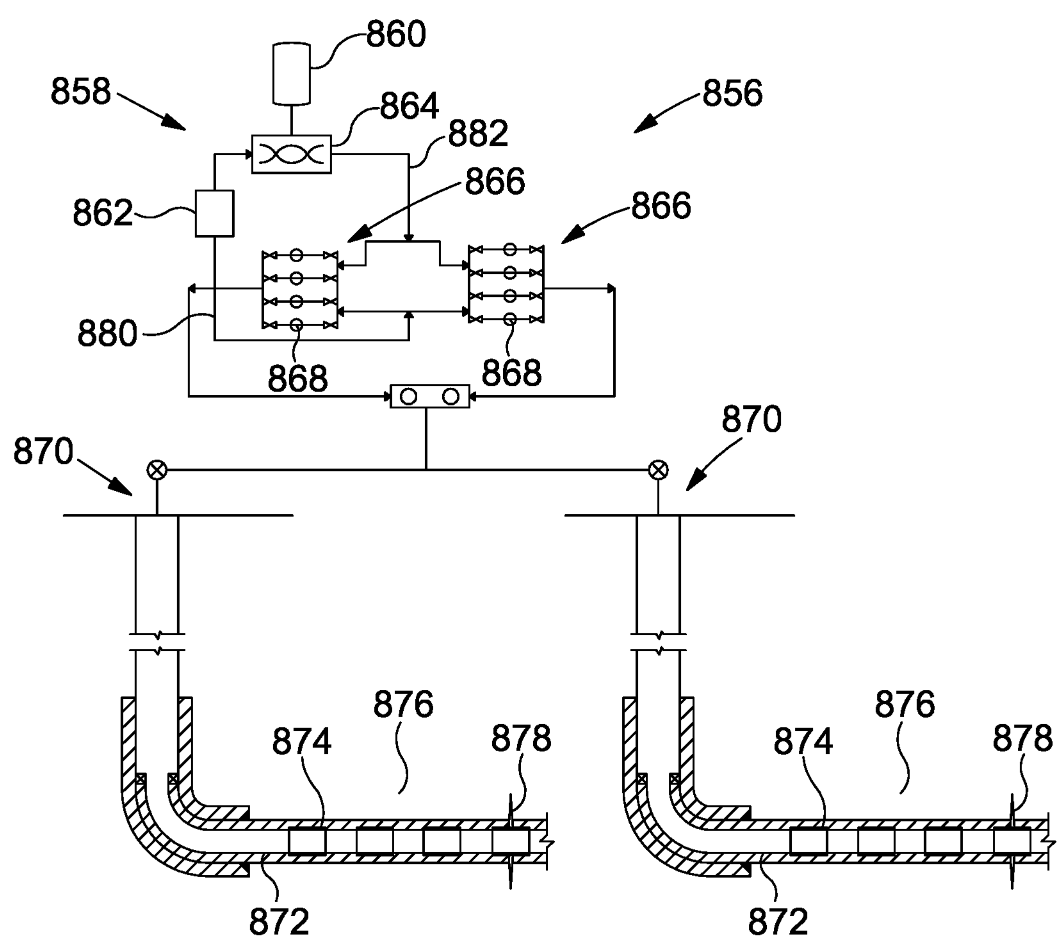
FIG. 8 is a schematic diagram of a system for multi-well stimulation.

FIG. 8 shows a system 856 according to an embodiment. The system comprises a frac crew 858 (or surface fracturing equipment 858) with a proppant tank 860, a fluid tank 862, a blender 864, two pumping units 866 with four high pressure pumps 868 each. The system also comprises two wellbores 870, each connected to the surface fracturing equipment 858 to allow simultaneous stimulation as described herein. The wellbores 870 comprise casing 872 and permanently installed sleeves 874. Each sleeve 874 may be opened in turn to allow fluid communication between the wellbore 870 and the surrounding formation 876. A single sleeve in each well 870 is open during stimulation, so as to create a single primary fracture 878 in each well. The pumping units 866 have a clean side 880 from the water tank 862, and a slurry side 882 from the blender 864. Some of the high pressure pumps 868 in each pumping unit 866 are dedicated to pumping only water and are fed from the clean side 880. The other high pressure pumps 868 are fed from the slurry side 882. The slurry and the water are pumped simultaneously into each wellbore 870, but the flow rate into each well 870 can be individually controlled.

In another embodiment, each region (frac stage) may be perforated in advance, before starting the stimulation. In this case, the stage that is currently being fractured in a given well is isolated from all other stages. This is achieved by using appropriate downhole fracturing apparatus. For example, a temporary fracturing device such as the reservoir stimulation tool described herein may be used.

An added benefit of using multi-well stimulation, as shown in FIG. 4, is that fewer facilities and less maintenance is required. In multi-well stimulation, wireline and crane units may not be needed. The split flow allows the blender 430 to run at a lower rate, allowing for lower maintenance and better control. In other embodiments, the flow may not be split (i.e. no clean side). Additionally, pumps 432 can be arranged more efficiently. In this example, a group of pumps 432 is dedicated to a specific well 420, so that the flow rate in each well 420 can be controlled independently, even if the wells 420 have appreciable differences in surface treating pressure. Pumps 432 can also be specifically dedicated to pump fluid without proppant or fluid with proppant, allowing for lower required maintenance for all the pumps 432. With lower treating pressures, the pumps 432 can handle higher flow rates. In some circumstances it may be necessary to flush a well (e.g. due to clogging and trapped sand in the perforations) by only pumping water (and no slurry) into that well. In this case, all the pumps pumping slurry into that well can be turned off, so that only the clean side is operating for that well. Meanwhile, slurry may still be pumped into any other well in order to reduce NPT.

Hence it is seen that various embodiments may provide one or more of the following contributions: A combination of single-point frac sleeves with simultaneously fracturing operations on a well pad; a method of increasing surface treating rates while decreasing surface treating pressures for fracturing operations on a well pad; a method that may reduce pumping equipment failure and maintenance; a method of introducing multiple and independent hydraulic sources at precise locations in the reservoir to enhance the fractured surface area; and a method to improve fluid and proppant distribution evenly along the well, allowing for better well stacking in leases/sections.

It will be appreciated by the person skilled in the art that various modifications may be made to the above described embodiments without departing from the scope of the invention.

Each feature disclosed or illustrated in the present specification may be incorporated in the invention, whether alone or in any appropriate combination with any other feature disclosed or illustrated herein.

The invention claimed is:

1. A reservoir stimulation tool for stimulating a formation surrounding a cased wellbore having an inner wall, said tool comprising:

- a tubular string comprising an outer wall and an inner bore, said tubular string being configured to be inserted into the wellbore so as to form an annular space between the tubular string and said inner wall of the wellbore;
- a plurality of ports formed in said outer wall of the tubular string;
- a plurality of port valves for opening or closing said ports;
- a plurality of releasable packers coupled to the tubular string, wherein each packer is configured to be expanded in order to engage said inner wall of the wellbore, thereby isolating two or more longitudinal segments of said annular space from each other; and
- a sensor in each of said two or more longitudinal segments for measuring one or more fluid properties in the wellbore, wherein said reservoir stimulation tool is configured to store measured data from said sensors at said reservoir stimulation tool during stimulation and/or production so that said measured data is recoverable for analysis at the surface after said reservoir stimulation tool has been run out of the well.

2. The reservoir stimulation tool according to claim 1, wherein each of said port valves comprises a sleeve which is movable longitudinally and/or rotationally along said tubular string in order to open or close one of said ports.

3. The reservoir stimulation tool according to claim 2, wherein the sleeve is actuated mechanically or electrically.

4. The reservoir stimulation tool according to claim 1, further comprising a plurality of isolation valves, wherein each isolation valve is configured to be closed in order to isolate a section of the wellbore.

5. The reservoir stimulation tool according to claim 4, wherein each isolation valve is located adjacent to and downstream of a corresponding port of said plurality of ports, so that when the isolation valve is closed, the corresponding port is isolated from a section of the wellbore that is downstream of said corresponding port.

6. The reservoir stimulation tool according to claim 1, wherein at least one of the ports is located between two adjacent packers of said plurality of releasable packers.

7. The reservoir stimulation tool according to claim 1, wherein each of the ports is located between two adjacent packers of the plurality of releasable packers.

8. The reservoir stimulation tool according to claim 1, wherein said fluid properties comprise at least one of temperature, pressure, flow rate, gas to oil ratio and water to oil ratio.

9. A method of stimulating a formation surrounding a cased wellbore having an inner wall, said method comprising:

inserting a reservoir stimulation tool into the wellbore, wherein said reservoir stimulation tool comprises a tubular string comprising an outer wall and an inner bore, a plurality of releasable packers coupled to the tubular string, a plurality of ports formed in said outer wall of the tubular string, and a plurality of port valves for opening or closing said ports;

expanding said plurality of releasable packers to engage the inner wall of the wellbore, thereby isolating two or more longitudinal segments of an annular space between the tubular string and the inner wall of the wellbore from each other;

opening a first port valve of said plurality of port valves to open a first port of said plurality of ports to allow fluid communication between a first longitudinal segment of the annular space and the inner bore of the tubular string;

stimulating the formation surrounding said first longitudinal segment;

measuring one or more fluid properties with a first sensor in said first longitudinal segment of the annular space and storing measured data at said reservoir stimulation tool;

running said reservoir stimulation tool out of said wellbore; and after running said reservoir stimulation tool out of said wellbore, recovering said measured data for analysis at the surface.

10. The method according to claim 9, wherein the step of stimulating comprises pumping a fracturing fluid along the inner bore of the tubular string and into said first longitudinal segment to create a first primary fracture in the formation.

11. The method according to claim 10, wherein said fracturing fluid comprises one or more of water, water with dissolved macromolecules, water mixed with a proppant, water with dissolved macromolecules and mixed with a proppant, carbon dioxide, nitrogen, natural gas, natural gas liquids, and crude.

12. The method according to claim 10, further comprising opening a second port valve of said plurality of port valves to open a second port of said plurality of ports to allow fluid communication between a second longitudinal segment of the annular space and the inner bore;

isolating the first primary fracture in the formation; and pumping said fracturing fluid along the inner bore of the tubular string and into said second longitudinal segment to create a second primary fracture in the formation.

13. The method according to claim 12, wherein said first port valve is not adjacent to said second port valve, so that said first primary fracture and said second primary fracture are formed in respective frac stages that are not adjacent to each other and there are one or more frac stages between them that have not been stimulated.

14. The method according to claim 12, wherein the step of isolating comprises at least one of closing the first port valve, and closing an isolation valve in the inner bore of the tubular string between the first and second ports.

15. The method according to claim 12, wherein said step of opening a second port valve and said step of isolating the first fracture are done simultaneously or substantially simultaneously.

16. The method according to claim 9, wherein the step of stimulating comprises injecting a fluid into said first longitudinal segment at a pressure that is below a fracturing pressure of said formation.

17. The method according to claim 9, wherein said tubular string is configured to be inserted into the wellbore so as to form an annular space between the tubular string and said inner wall of the wellbore, and wherein each packer is configured to be expanded in order to engage said inner wall of the wellbore, thereby isolating two or more longitudinal segments of said annular space from each other.

18. A method of stimulating a plurality of wells, said method comprising performing the steps of claim 9 in each of the wells of said plurality of wells.

19. The method according to claim 18, wherein at least step d) is performed simultaneously, or substantially simultaneously, in each of said wells.

20. A method of producing hydrocarbons from a reservoir, said method comprising:

drilling a wellbore extending into the reservoir;

stimulating a formation surrounding the wellbore according to the method of claim 9; and producing hydrocarbons from the wellbore.

21. The method according to claim 20, further comprising reconditioning the reservoir stimulation tool after running the reservoir stimulation tool out of the wellbore, and then inserting the reservoir stimulation tool into a second wellbore.

* * * * *